United States Patent
Chamberlain

(10) Patent No.: US 9,401,836 B2
(45) Date of Patent: Jul. 26, 2016

(54) METHODS AND APPARATUS FOR CONFIGURING MULTIPLE LOGICAL NETWORKS OF DEVICES ON A SINGLE PHYSICAL NETWORK

(75) Inventor: Robert L. Chamberlain, Raleigh, NC (US)

(73) Assignee: Renesas Electronics America Inc., Santa Clara, CA (US)

( * ) Notice: Subject to any disclaimer, the term of this patent is extended or adjusted under 35 U.S.C. 154(b) by 494 days.

(21) Appl. No.: 13/274,925

(22) Filed: Oct. 17, 2011

(65) Prior Publication Data

US 2012/0082308 A1   Apr. 5, 2012

Related U.S. Application Data

(63) Continuation of application No. 10/253,708, filed on Sep. 25, 2002, now abandoned.

(60) Provisional application No. 60/335,041, filed on Oct. 19, 2001.

(51) Int. Cl.
| | |
|---|---|
| *G06F 15/16* | (2006.01) |
| *H04L 29/12* | (2006.01) |
| *H04L 29/06* | (2006.01) |
| *H04L 12/28* | (2006.01) |
| *H04L 12/24* | (2006.01) |
| *H04W 8/26* | (2009.01) |
| *H04W 16/00* | (2009.01) |

(52) U.S. Cl.
CPC ...... *H04L 29/12009* (2013.01); *H04L 12/2805* (2013.01); *H04L 29/06* (2013.01); *H04L 29/12207* (2013.01); *H04L 41/0806* (2013.01); *H04L 61/20* (2013.01); *H04L 63/0428* (2013.01); *H04L 63/06* (2013.01); *H04L 12/2807* (2013.01); *H04W 8/26* (2013.01); *H04W 16/00* (2013.01)

(58) Field of Classification Search
CPC .................................................. H04L 2/0872
USPC ........................................ 709/203, 220, 227
See application file for complete search history.

(56) References Cited

U.S. PATENT DOCUMENTS

| | | | | | |
|---|---|---|---|---|---|
| 5,671,439 | A | * | 9/1997 | Klein et al. ....................... | 710/1 |
| 5,890,189 | A | * | 3/1999 | Nozue ................... | G06F 12/109 |
| | | | | | 711/100 |
| 6,098,098 | A | * | 8/2000 | Sandahl et al. ............... | 709/221 |
| 6,148,354 | A | * | 11/2000 | Ban ....................... | G06F 3/0607 |
| | | | | | 710/301 |
| 6,246,696 | B1 | * | 6/2001 | Yamaguchi et al. .......... | 370/475 |
| 6,618,377 | B1 | * | 9/2003 | Miriyala .............. | H04L 12/5601 |
| | | | | | 370/241.1 |
| 6,704,768 | B1 | * | 3/2004 | Zombek ................ | H04L 1/1635 |
| | | | | | 370/254 |
| 6,785,736 | B1 | * | 8/2004 | Barillaud ....................... | 709/241 |
| 6,934,269 | B1 | * | 8/2005 | Hasha et al. ................... | 370/312 |
| 7,039,477 | B1 | * | 5/2006 | Kamiya ................ | G10H 1/0091 |
| | | | | | 700/94 |

(Continued)

*Primary Examiner* — Khanh Dinh
(74) *Attorney, Agent, or Firm* — Campbell Stephenson LLP

(57) ABSTRACT

Methods and apparatus for configuring multiple logical networks that share a common transmission medium are presented. According to an exemplary embodiment, an apparatus for configuring multiple logical networks of devices on a single physical network includes a transceiver configured to exchange information with devices connected to a shared bus of the physical network. The apparatus includes logic configured to assign a network number to a new logical network when the apparatus is first activated on the shared bus, the assigned network number being different from network numbers associated with other logical networks using the shared bus.

11 Claims, 6 Drawing Sheets

(56) References Cited

U.S. PATENT DOCUMENTS

| | | | |
|---|---|---|---|
| 7,058,973 B1* | 6/2006 | Sultan | 726/12 |
| 7,940,685 B1* | 5/2011 | Breslau et al. | 370/251 |
| 2001/0014945 A1* | 8/2001 | Muschenborn | 713/201 |
| 2003/0018889 A1* | 1/2003 | Burnett et al. | 713/153 |
| 2003/0079000 A1* | 4/2003 | Chamberlain | 709/220 |
| 2012/0185586 A1* | 7/2012 | Olshansky | 709/224 |

* cited by examiner

Figure 1 - Multiple Logical Networks Sharing A Common Powerline Physical Network Figure 2 - Adding A Network Configuration Apparatus To Form A New Logical Network Figure 3 - Adding A New Device To A Logical Network Figure 4 - Adding A Secure Network Configuration Apparatus To Form A Secure Logical Network Figure 5 – Adding A New Device To A Secure Logical Network

METHODS AND APPARATUS FOR CONFIGURING MULTIPLE LOGICAL NETWORKS OF DEVICES ON A SINGLE PHYSICAL NETWORK

RELATED APPLICATIONS

The present patent application is a continuation of U.S. patent application No. 10/253,708, filed on Sep. 25, 2002, now abandoned entitled "Methods and Apparatus For Configuring Multiple Logical Networks of Devices on a Single Physical Network," which claims priority under 35 U.S.C. §119(e) to U.S. patent application No. 60/335,041, entitled "Logical Network Configuration Apparatus," filed on Oct. 19, 2001, and is incorporated by reference herein in its entirety and for all purposes. The applications are assigned to Renesas Electronics America, Inc., the assignee of the present invention, and hereby incorporated by reference, in its entirety and for all purposes.

BACKGROUND

What is described are methods and apparatus for configuring a logical network of devices. In particular, methods and apparatus for configuring multiple logical networks that share a common transmission medium are presented.

Home network is a phrase often used to refer to the last hundred feet of any consumer-related network. Traditionally, home networks have largely been used to interconnect personal computers (PCs) and computer peripheral devices, such as printers and scanners, within the home, so that the resources of the peripheral devices could be shared among PC users. In addition, home networks have enabled PC users to share access to broadband Internet connections that are linked to the network.

Recent advancements in the development of smart devices and appliances are causing a paradigm shift to occur in the public's perception of the home network. These advanced smart devices now allow users to control and monitor events in such devices as consumer-based appliances, home electronics, and home-security systems. Indeed, the sales of non-PC central processing unit (CPU)-powered devices, such as computer games, telephones, personal digital assistants (PDAs), set top boxes, and other consumer goods, now surpass the sales of PCs.

Like most networks, home networks are either built around a shared wired or a shared wireless medium. Popular wired mediums include category 5 twisted-pair (used with Ethernet-based systems), telephone line (or category 3 twisted-pair), broadband cable, and powerline carrier (PLC), which uses AC power lines to carry network information throughout the home. Several wireless (or radio frequency [RF]) transport elements are emerging for home networking, including IEEE 802.11, HomeRF, Bluetooth™, and standard wireless access protocol (SWAP).

Whether wired or wireless, home networks should be simple to configure and should operate reliably over long periods of time. If the configuration process is not maintenance-free, easy to use, and quick to install new devices, it will not likely be embraced by the public. Another consumer expectation of home networks is that no new wires should have to be installed in the home to network together smart appliances, such as washing machines, microwave ovens, and air conditioners. In most households, this limits the possible media upon which the home network can be based to RF or PLC. While nearly every household has telephone wiring installed, access to this wiring is usually limited to three or four access points within the home. In contrast, most household appliances are directly connected to a PLC, and RF transport elements by their very nature require no wiring.

A problem associated with PLC and RF-based home networks is that the media are not physically constrained to a single home or apartment. With RF-based networks, the number of homes and apartments that can share the medium is constrained only by the strength of the RF transmissions and the sensitivity of the smart device receivers. With PLC-based network, the number of homes and apartments that can share the medium is constrained to the number of households physically attached to a common power line transformer. In many cases, a single transformer may service several hundred households.

To address this problem, the individual households sharing a common PLC or RF physical network can each be serviced by respective secure logical networks that only allow smart devices physically existing within the individual home access to the network. Accordingly, there exists a need for simple, reliable techniques for configuring smart devices that are attached to a common transmission medium to interoperate in separate, secure logical networks. The established logical networks should be secure from "attacks" from other devices connected to the shared physical medium.

As the paradigm shift to non-PC-based home networks begins to occur, it is unlikely that homeowners will install traditional networking elements, such as routers, switches, and control points, into the home. Yet, it will be desirable to configure devices operating in the home network to use many of the complex functions and capabilities available with these traditional networking elements.

For example, a homeowner may wish to install a pair of smart switches and a smart power outlet, and then to configure these devices to operate such that a switch, installed at each door of a room of the house, controls a lamp plugged into the smart outlet. Moreover, it would be desirable for the smart switches to be capable of being installed in locations where existing wiring to other fixtures is already in place, but to be configurable to control only those devices connected into the smart outlet.

Accordingly, there also exists a need for techniques to easily add new or additional smart devices to the home and to configure these devices to join an already established logical network with a minimum of interaction and skill from the homeowner. The techniques should be such that newly or additionally installed devices should be configurable to not interfere with the operation of existing household wiring or to override existing wired connections if the homeowner so desires.

Conventional techniques for configuring individual logical networks typically require that the individual network devices be configured physically, e.g., using switches, to define both a physical address and a network node address for the devices. Other conventional techniques require that a sophisticated device having a user interface, e.g., a PC or a central home controller, be used to assign the network addresses to the smart devices. Home networks requiring such sophisticated devices are often referred to as PC-centric or controller-based networks. Both of these conventional logical network configuration techniques have their drawbacks.

First, conventional techniques that employ physical configuration typically require that the person(s) configuring the network have knowledge of all logical network numbers and all network node numbers currently in use on the physical network. As discussed above, since a PLC physical network may be shared among several households, this technique requires that the logical network numbers and network node numbers in all neighboring homes on the shared PLC must be known. Moreover, such conventional configurable networks are generally not secure, as the established logical networks are open to attacks by persons that deliberately install devices on the logical network whose address is currently in use.

Second, conventional techniques that require PC-centric or controller-based networks require that a relatively expensive PC or controller be installed in the home, and that a sufficiently skilled person carry out the configuration using the PC or controller. Such a conventional PC-centric based system is described in U.S. Pat. No. 6,175,860 to Gaucher, titled "Method and Apparatus for an Automatic Multi-Rate Wireless/Wired Computer Network".

SUMMARY

Accordingly, one object is to provide techniques for simple, reliable techniques for configuring smart devices that are attached to a common transmission medium to interoperate in separate, secure logical networks. Another object is to provide techniques to easily add new or additional smart devices to the home and to configure these devices to join an already established logical network with a minimum of interaction and skill from the homeowner. These objects are addressed by methods and apparatus for configuring multiple logical networks of devices on a single physical network.

According to one aspect, an apparatus is provided for configuring multiple logical networks of devices on a single physical network. The apparatus includes a transceiver configured to exchange information with devices connected to a shared bus of the physical network. Logic is configured to assign a network number to a new logical network when the apparatus is first activated on the shared bus, the assigned network number being different from network numbers associated with other logical networks using the shared bus. Logic is also configured to enter into a configuration mode for a limited amount of time, during which time the apparatus is capable of participating in a configuration session with at least one of the devices connected to the bus. Additional logic is configured to assign a logical address to the at least one device while participating in the configuration session with the at least one device, the assigned logical address being different from all logical addresses associated with devices belonging to other logical networks on the physical network. After configuration, the at least one device responds only to information addressed to its assigned logical address within the new logical network.

According to a related aspect, the logic configured to assign a logical network number includes logic configured to assign a node address to the at least one device. Additional logic is configured to combine the network number assigned to the new logical network with the node address assigned to the at least one device to form the logical address of the at least one device.

According to another related aspect, the apparatus further includes logic configured to generate a network encryption key associated with the new logical network for encrypting/decrypting information exchanged among devices belonging to the new logical network.

According to yet another related aspect, the apparatus further includes logic configured to accept a one-time encryption key associated with the at least one device.

According to another aspect, an arrangement of multiple logical networks of devices operating on a single physical network is provided. The arrangement a shared bus. A number of devices are connected to the shared bus. A network configuration apparatus (NCA) associated with each logical network operating on the physical network is also included. Each NCA includes a transceiver configured to exchange information with the devices connected to the shared bus. An NCA also includes logic configured to assign a network number to the logical network associated with the NCA when the NCA is first activated on the shared bus, the assigned network number being different from network numbers associated with other logical networks using the shared bus. In addition, an NCA includes logic configured to enter into a configuration mode for a limited amount of time, during which time the NCA is capable of participating in a configuration session with at least one of the devices connected to the bus. Also, the NCA includes logic configured to assign a logical address to the at least one device while participating in the configuration session with the at least one device, the assigned logical address being different from all logical addresses associated with devices belonging to other logical networks on the physical network. After configuration, the at least one device responds only to information addressed to its assigned logical address within the logical network associated with the NCA.

According to another aspect, a method for configuring multiple logical networks of devices connected to a shared bus of a single physical network is provided. The method includes the step of assigning a network number to a new logical network, the assigned network number being different from network numbers associated with other logical networks using the shared bus. A configuration mode is entered into for a limited amount of time, during which time a configuration session is capable of being established with at least one of the devices connected to the bus. A logical address is assigned to the at least one device during the configuration session, the assigned logical address being different from all logical addresses associated with devices belonging to other logical networks on the physical network. After configuration, the at least one device responds only to information addressed to its assigned logical address within the new logical network.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

BRIEF DESCRIPTION OF THE DRAWINGS

The above objects, features, and advantages will become more apparent in light of the following detailed description in conjunction with the drawings, in which like reference numerals identify similar or identical elements, and in which.

DETAILED DESCRIPTION

Preferred embodiments are described below with reference to the accompanying drawings. In the following description, well-known functions and/or constructions are not described in detail to avoid obscuring the description in unnecessary detail.

Applicant describes techniques for establishing a secure logical network of devices that are connected to one another by a shared physical medium (or bus). According to an exemplary embodiment, these techniques may be managed through at least one network configuration apparatus (NCA) that is also connected to the shared bus, but they need not be. For example, the tasks described below as being carried out by an NCA could instead be integrated into one or all of the devices connected to the shared bus, eliminating the need for a separate NCA. Preferably, a single NCA is used to configure and coordinate the activities of the devices operating within a respective logical network, but again the described techniques are not limited to such an arrangement. Moreover, exemplary methods for establishing logical networks of devices are described in conjunction with arrangements that include at least one NCA, but the described methods may be applied with other arrangements, including peer-to-peer arrangements where the devices themselves configure and control the various logical networks.

Figure 1:
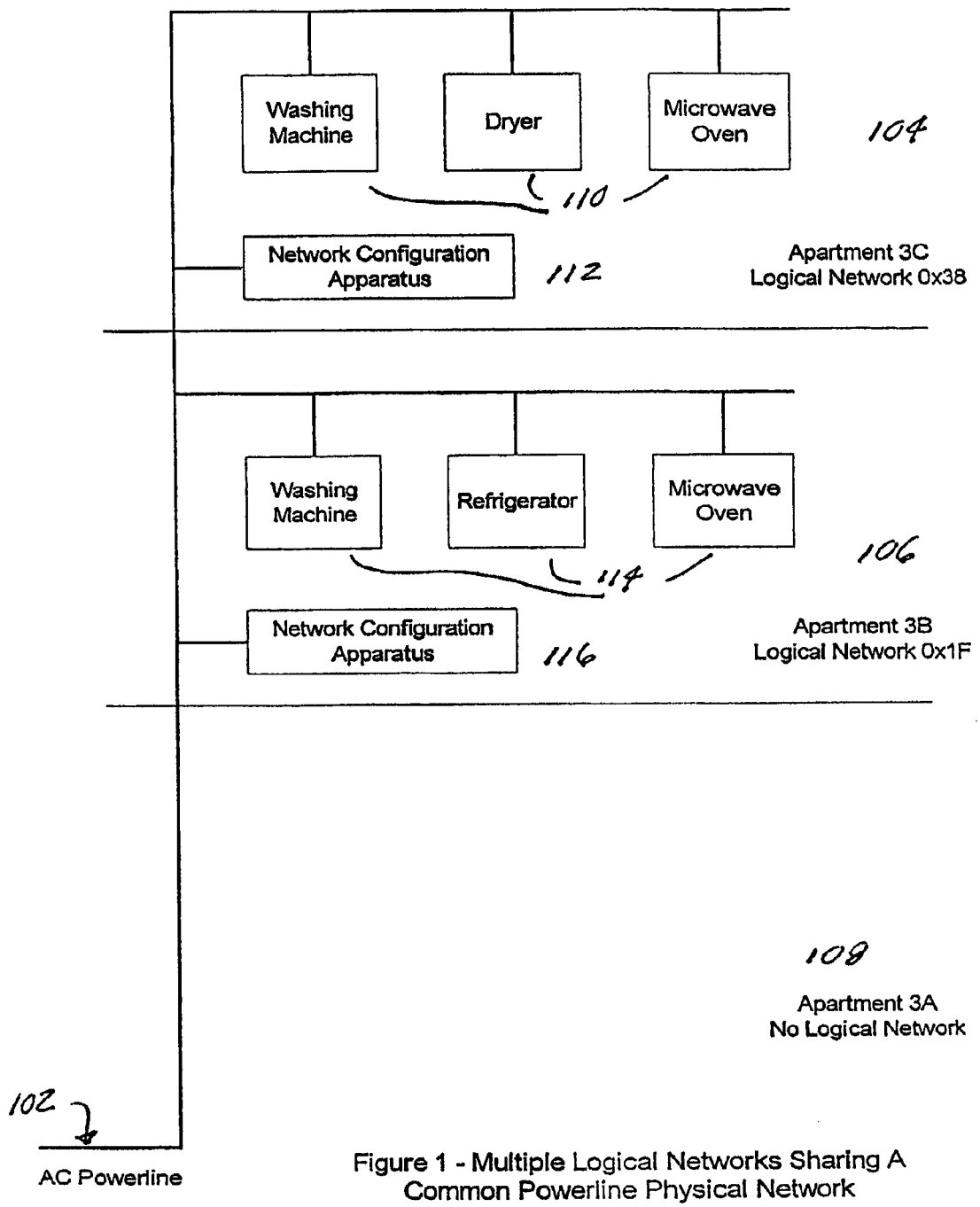
FIG. 1 depicts a PLC network including a number of devices arranged into multiple logical networks.

With these concepts in mind, FIG. 1 shows an arrangement in which a shared bus 102 spans across what are or are to be three separate and distinct logical networks 104/106/108. The shared bus 102 is shown as a PLC, but any of the above-described media may have been depicted. Each of the logical networks 104/106/108 in the figure either correspond to or are to correspond to a physical dwelling, but this need not be the case. For example, more than one logical network could be established within a single physical dwelling. The arrangement describes two logical networks 104/106 already being configured in two of the apartments shown, numbers 3B and 3C. Each of the logical networks includes several networked devices 110/114, and a dedicated NCA 112/116. A third logical network 108 is yet to be established in apartment 3A.

It will be understood that the devices 110 operating in apartment 3C must function in complete logical isolation from the devices 114 operating in apartment 3B (or any other physical location linked by the shared bus 102). To achieve this functional isolation, logical networks are established in each of the apartments 3B and 3C. Each logical network is identified by a unique logical network number, e.g., 0x1F and 0x38 for the logical networks of apartments 3B and 3C, respectively. Although all of the devices 110/114 in the arrangement share the bandwidth of the physical PLC network, the devices 110/114 existing in individual apartments (and thus existing in different logical networks) operate as if being attached to one another in separate, isolated "local" networks.

The devices 110/114 operating within a given logical network 104/106 are preferably assigned respective network node numbers (not shown). According to an exemplary embodiment, a combination of a device's individual node address and the logical network number of the logical network 104/106/108, which the device operates in, forms the logical address of the device on the shared bus 102. The logical address may represent a portion of the physical address of the device on the shared bus 102 that corresponds to the relative portion of the address space the logical network 104/106/108 occupies of the overall address space of the physical network. This allows the device to intercommunicate only with other devices belonging to its logical network, while essentially remaining isolated from the operation of other devices connected to the same shared bus. Also, using only a portion of the physical address of the device to form its logical address, allows for more efficient addressing techniques to be employed.

Since unique logical network numbers are used to form a device's logical address on the bus 102, device node numbers may be shared (or repeated) among the various logical networks 104/106/108 established on the shared bus 102. Moreover, device node numbers may be shared by devices of the same logical network if an arrangement where two or more devices of the same logical network are addressable at the same time is desired.

Figure 2:
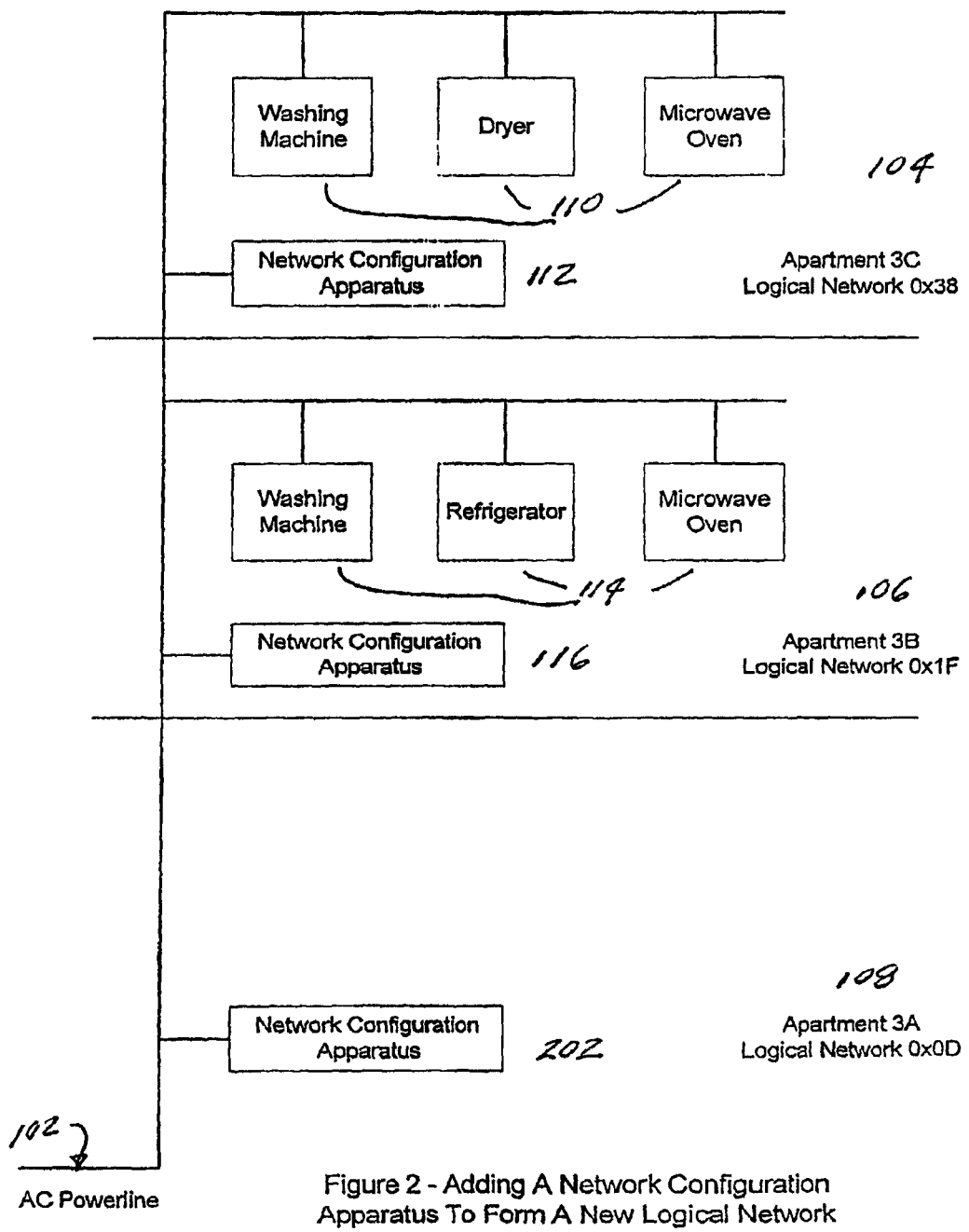
FIG. 2 depicts the arrangement of FIG. 1, adding a network configuration apparatus (NCA) and corresponding new logical network to the PLC network.

FIG. 2 further illustrates the arrangement of FIG. 1 with the third logical network 108 being newly established in apartment 3A. An NCA 202 is attached to the shared bus 102 and is used to configure and coordinate devices included in the third logical network 108. The NCA 202 includes circuitry to enable it to communicate with other NCAs 112/116 connected to the shared bus 102. For example, the NCA 202 will typically include a physical layer (PHY) interface for exchanging information over the bus 102. The NCA 202 may also include media access control (MAC) circuitry for exchanging logical information with the other devices connected to the shared bus 102. Together, the PHY and MAC functions are typically referred to as a transceiver. MAC information may be exchanged according to the transmission protocol (e.g., Ethernet, ATM, or 802.11(b)) used to send information over the bus 102. While the design of specific PHY and MAC circuitry is beyond the scope of this document, those skilled in the art will understand how to incorporate the NCA functionality described below into such designs.

According to an exemplary embodiment, when the NCA 202 is connected to the shared bus 102, the NCA 202 will query the devices connected to the bus 102 to determine if other NCAs 112/116 are present on the bus. In the exemplary arrangement, the NCAs establishing logical networks in apartments 3B and 3C will be detected by the new NCA 202 during the query. The new NCA 202 determines the logical network numbers being used by the detected NCAs 112/116. Once the already used logical network numbers are determined, the new NCA 202 may choose a unique logical network number to identify itself to other devices on the shared bus 102.

According to a preferred embodiment, the NCA 202 further includes circuitry for generating a network encryption key. The network encryption key may be used to encrypt information exchanged over the shared bus 102 among devices within its logical network 108. Each NCA 112/116/202 generates a unique encryption key for use within its logical network. One technique for generating an encryption key is to use the unique logical network number of an NCA as a seed that may be passed to a random number generator. The result will be a pseudo-random number that may then be used as the encryption key for the NCA's logical network. Those skilled in the art will understand that other techniques for generating unique encryption keys are possible, but providing a detailed description of those techniques are beyond the scope of this document.

Once the logical network number is assigned and the network encryption key generated for a particular NCA 112/116/202, the values are stored in non-volatile memory of the NCA. The NCAs then enter into a so-called passive state, waiting for network devices to request access to the NCA's logical network.

Figure 3:
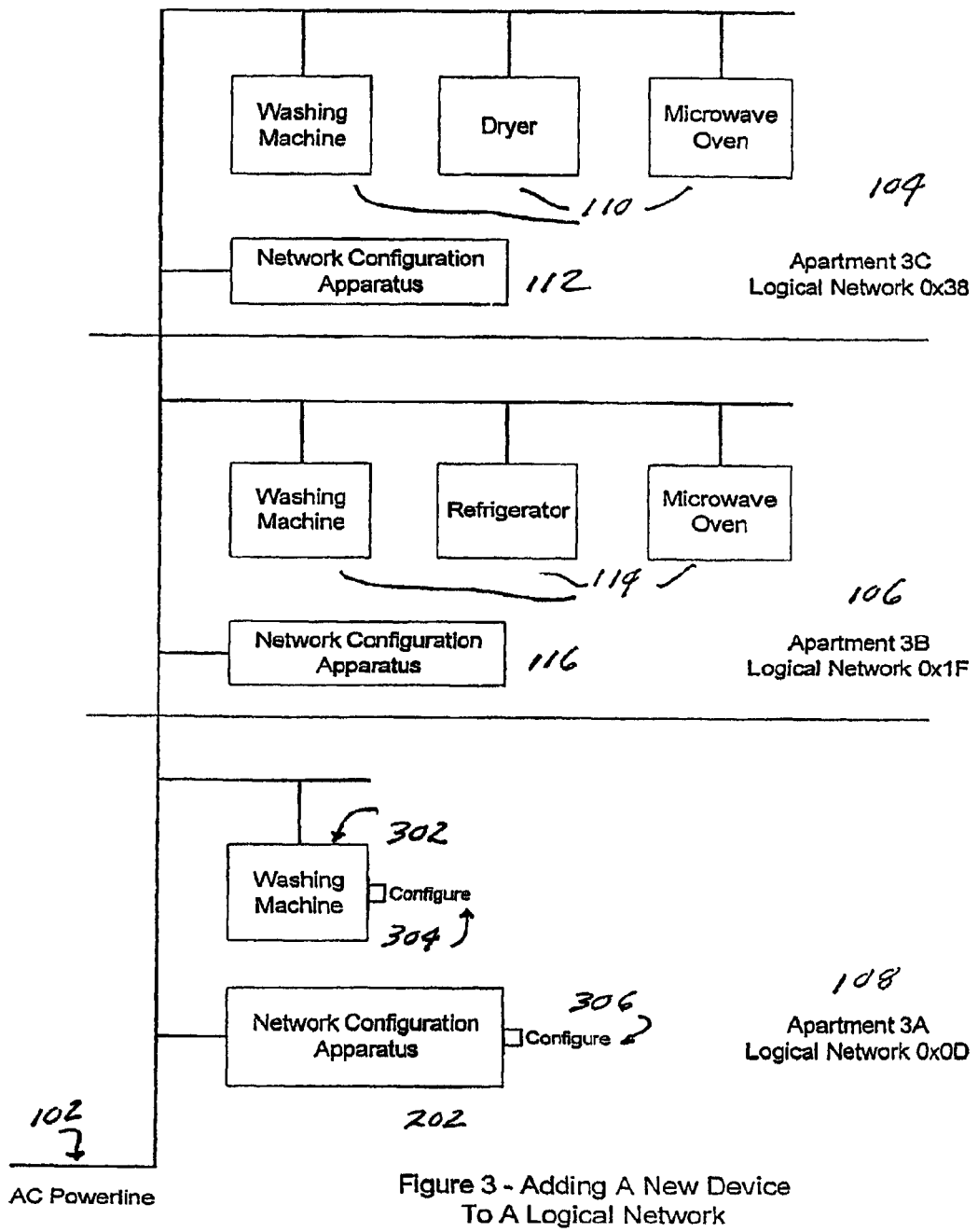
FIG. 3 depicts the arrangement of FIG. 2, further adding devices to the new logical network.

FIG. 3 further builds on the arrangement shown in FIGS. 1 and 2, and illustrates how a smart device, in this example a washing machine 302, may be added to the third logical network 108. According to a preferred embodiment, when a smart device, such as the washing machine 302, is first connected to the PLC bus 102 (e.g, when the device is plugged into an ordinary household power outlet), the device does not initially send any information over the bus 102.

Instead, the smart device waits to request access (or to respond to a solicitation for access) to a logical network until some triggering event occurs, but this need not be the case. The triggering event may be generated by circuitry, included within the device and/or an NCA, that is responsive to a number of device-related and/or environmental conditions. For example, the triggering event may occur automatically after a set period of time elapses from the time the device is first attached to the PLC. Alternatively, the device and/or the NCA may include circuitry that monitors network traffic on the bus 102 and then searches for information in the traffic to initiate the triggering event. This information may include, but is not limited to, indications that new devices have been connected to the shared bus.

According to an exemplary embodiment, both the smart device (or washing machine 302) and the NCA 202 include configure switches 304/306 that may be used to initiate the triggering event. When closed, the configure switches 304/306 enable the device 302 and NCA 202 to enter into a configuration mode. Whenever the device 302 and the NCA 202 are simultaneously operating in their respective configuration modes, they enter into a configuration session, after which the device 302 will be added to the logical network 108 managed by the NCA 202.

The device 302 and NCA 202 preferably remain in their respective configuration modes only for a limited period of time, e.g., five seconds, after their respective configure switches 304/306 are closed. If either the device 302 or the NCA 202 does not enter into its configuration mode while the other device is operating in its configuration mode, a configuration session between the device 302 and the NCA 202 will not be established. While, strictly speaking, the device 302 and the NCA 202 may operate in a "configuration mode" during the configuration session, the phrase "configuration mode" in this document refers to the limited time period that the NCAs and devices operate in when capable of participating in, but just prior to entering, a configuration session One or both of the configure switches 304/306 may be used to establish the configuration session between the device 302 and the NCA 202. For example, the configuration session may be initiated by the device 302 advertising its presence on the bus 102 and requesting to be configured into the logical network 108 in response to the configure switch 304 being closed. The NCA 202 may then participate in a configuration session with the device 302 by first entering into its configuration mode. This can occur either in response to the NCA 202 detecting the request sent by the device 302 in the traffic carried over the bus 102 or in response to the switch 306 being closed. As described above, the NCA 202 must enter its configuration mode while the device 302 is operating in its configuration mode, or the configuration session will not be established.

Alternatively, the NCA 202 could solicit new devices requiring configuration, such as the new device 302, to be configured to operate in its logical network 108 in response to the switch 306 being closed. The device 302 may then participate in a configuration session with the NCA 202 by first entering into its configuration mode. This can occur either in response to the device 302 detecting the solicitation sent by the NCA 202 in the traffic carried over the bus 102 or in response to the switch 304 being closed. As described above, the device 202 must enter its configuration mode while the NCA 202 is operating in its configuration mode, or the configuration session will not be established.

While participating in the configuration session, the NCA 202 uses its circuitry for communicating over the bus 102 to transfer a logical address to the device 302. Recall from above that the logical address of the device 302 is preferably a combination of an unused individual node address, assigned by the NCA 202 to the new device 302 during the configuration session, and the network number of the logical network 108. During the configuration session, the NCA 202 preferably also transfers the network encryption key, generated by the NCA 202 for its logical network 108, to the device 302. The device 302 stores the logical address and the network encryption key received from the NCA 202 into non-volatile memory. The configuration session is then ended, after which time the device 302 will only respond to commands sent over the shared bus 102 that are addressed to its logical address and encrypted using the assigned network encryption key. The device 302 is thus "captured" into the logical network 108 even though it is physically connected to all other devices attached to the shared bus 102.

Two security issues may arise with the arrangement depicted in FIGS. 1-3. First, there exists a relatively small, but finite, possibility that a new network device may be captured into the wrong logical network (e.g., into the logical network of a neighboring apartment) during the configuration process. Although the NCAs and smart devices are preferably designed to remain in their respective configuration modes for only a limited amount of time, a device in one household could enter its configuration mode within the period that an NCA in another household is also operating in its configuration mode, and thus be improperly captured into the other household's logical network. Second, with arrangement described above, the network encryption key, used to ensure secure transmissions over the shared bus 102, is transferred over the bus 102 unencrypted each time a new device is configured to join a logical network. This leaves open the possibility of the encryption key being acquired by unauthorized devices connected to the network.

Figure 4:
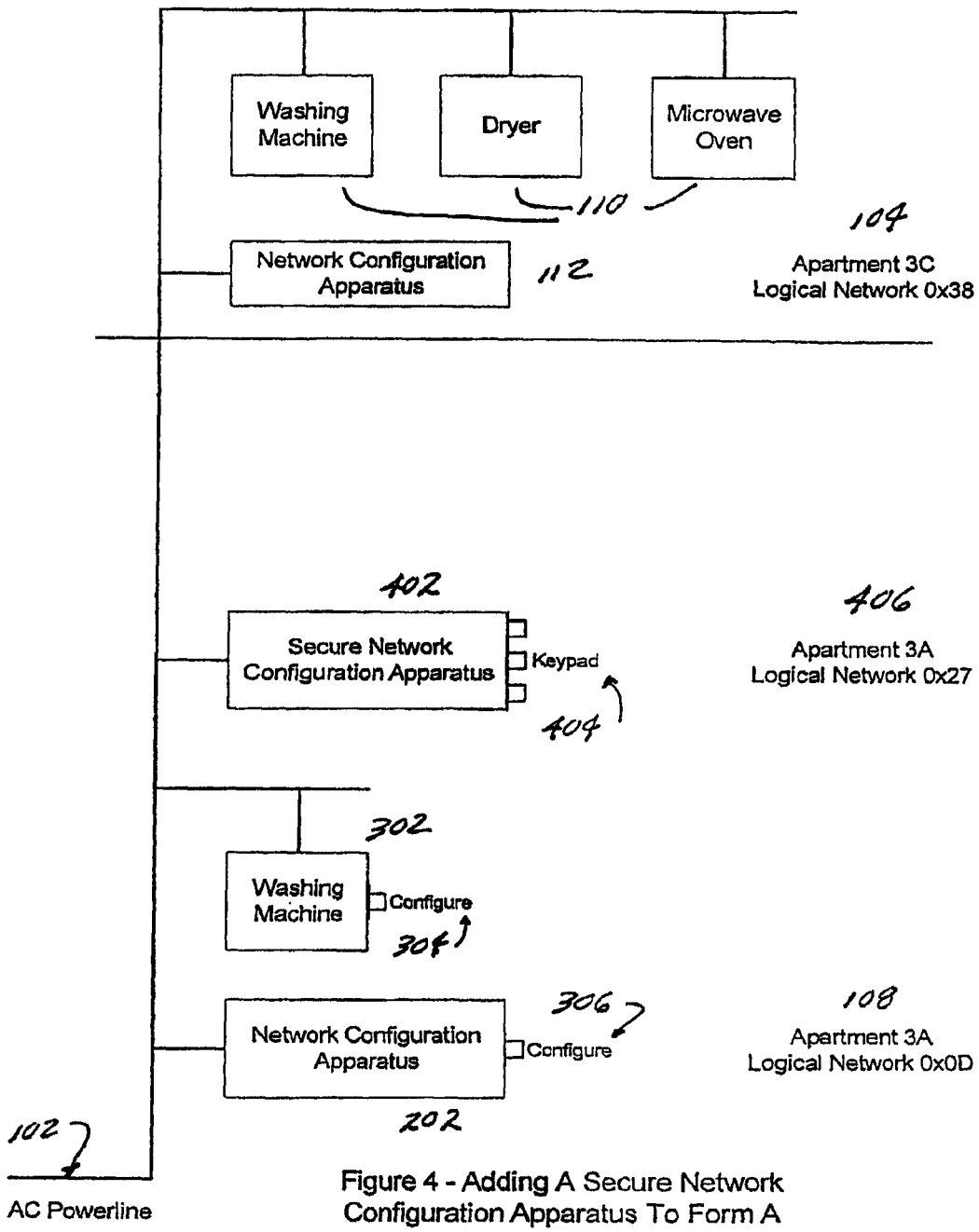
FIG. 4 depicts the arrangement of FIG. 3, further adding a secure NCA and corresponding new secure logical network to the arrangement.

FIG. 4 further builds on the arrangement depicted in FIGS. 1-3, and illustrates the addition of a secure NCA 402 to the arrangement that may be used to address the above-identified security concerns. The secure NCA 402 is connected physically to the shared bus 102 within apartment 3A. The secure NCA 402 includes circuitry for accepting a device-related encryption key. This circuitry may include a keypad, an optical scanner, or any other conventional type of input device. In the arrangement shown, the NCA 402 includes an input keypad 404. The secure NCA 402 is added to the physical network and establishes a logical network 406 in precisely the same manner as described above in conjunction with the non-secure NCA 202 illustrated in FIG. 2. The secure NCA 402 is capable of establishing a new logical network 406, having a corresponding unique network number 0x27, even though the secure NCA 402 is physically located in the same apartment (3A) where the non-secure logical network 108, having the network number 0x0D, already exists.

Figure 5:
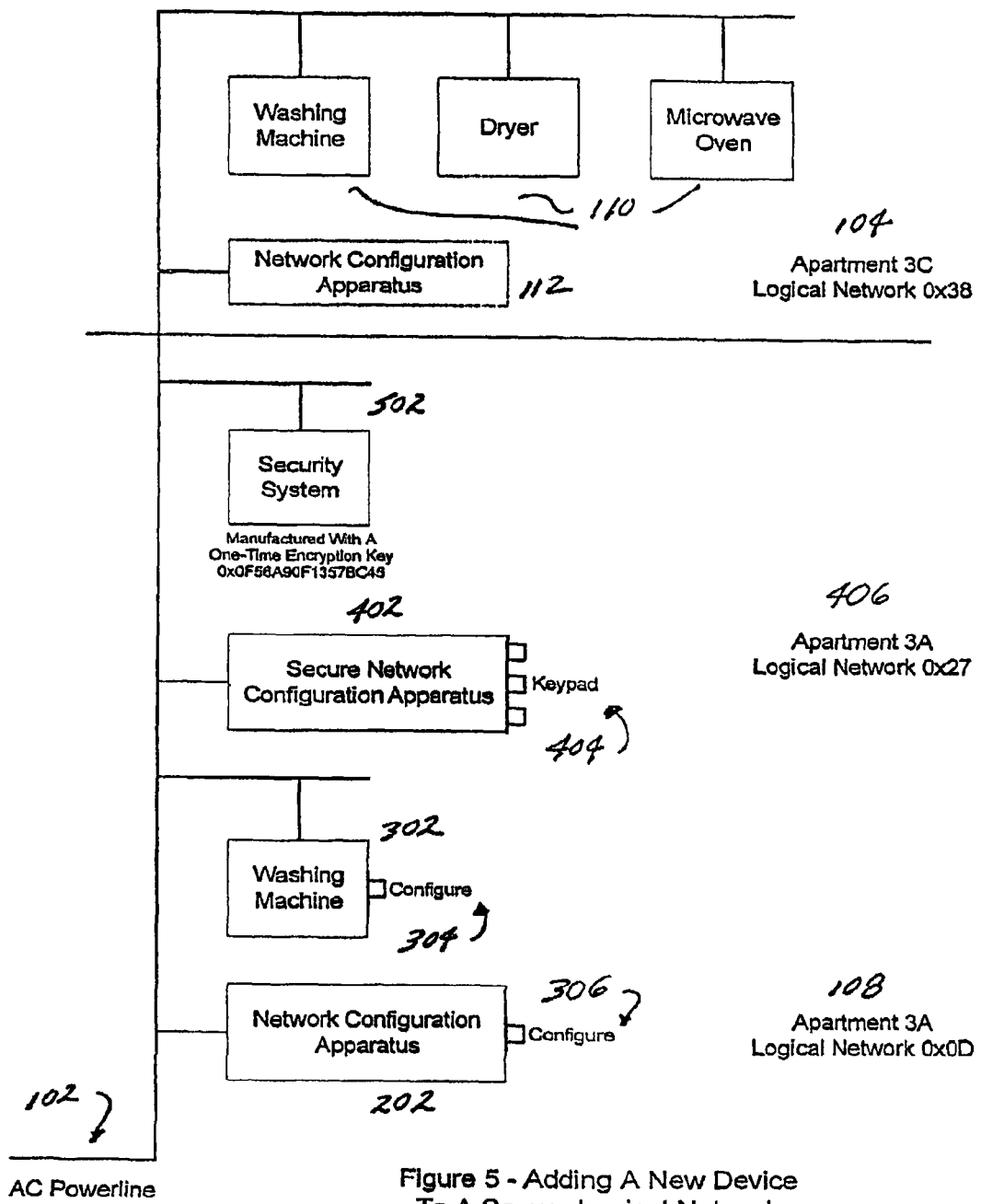
FIG. 5 depicts the arrangement of FIG. 4, further adding secure devices to the new secure logical network.

FIG. 5 illustrates an arrangement in which a secure device, e.g., a security system 502, is added to the new secure logical network 406 of FIG. 4. The secure device 502 differs from other smart devices 110/302 shown in the arrangement at least in that the smart device is designed to respond only to configuration messages that are encrypted with a "one-time" encryption key associated with the secure device 502. Preferably, the one-time encryption key is associated with a single smart device, or is sufficiently randomized such that the possibility of multiple secure devices having the same one-time encryption key and being attached to the same shared bus is acceptably small. Also, the one-time encryption key is preferably stored in non-volatile memory of the device 502.

The phrase "one-time" is used to distinguish this encryption key from the network encryption key described above. The encryption key associated with the secure device 502 is used only when the device 502 is participating in a configuration session. This key is to be contrasted with the network encryption key which may be used to encrypt every message exchanged between devices of a given logical network. Thus, the key will be used only one time if the device is never reconfigured into another logical network. Of course, it will be understood that the key can be used any number of times, should the device later be reconfigured into a different logical network.

Returning to the arrangement of FIG. 5, once the one-time encryption key for the secure device 502 is known, this key may be input into the memory of the secure NCA 402, e.g., using the keypad 404. Using the one-time encryption key, the secure device 502 and the secure NCA 402 may exchange secure configuration messages over the shared bus 102 during a configuration session. Thus, only the secure NCA 402 will be capable of responding to requests for configuration received from the secure device 502 that are encrypted with the one-time key. Similarly, only the secure device 502 will be capable of responding to solicitations received from the secure NCA 402 that are encrypted with the one-time key. Thus, the arrangement of FIG. 5 prevents the secure device 502 from being captured into an incorrect logical network.

According to a preferred embodiment, the secure NCA 402 uses the one-time key to encrypt the network encryption key for the logical network 406 prior to sending the network encryption key to the secure device over the shared bus 102. This will prevent the network encryption key from being acquired by unauthorized devices during any configuration session that takes place between the secure device 502 and the secure NCA 402. While it would be possible to configure the secure NCA 402 to both secure and non-secure devices join its logical network, doing so may result in the encryption key for the logical network being compromised during the configuration of non-secure devices. Accordingly, its is preferred that secure NCAs only respond to configuration requests from, and take part in configuration sessions with, secure devices for which a corresponding one-time encryption key has been accepted by the secure NCA 402.

Figure 6:
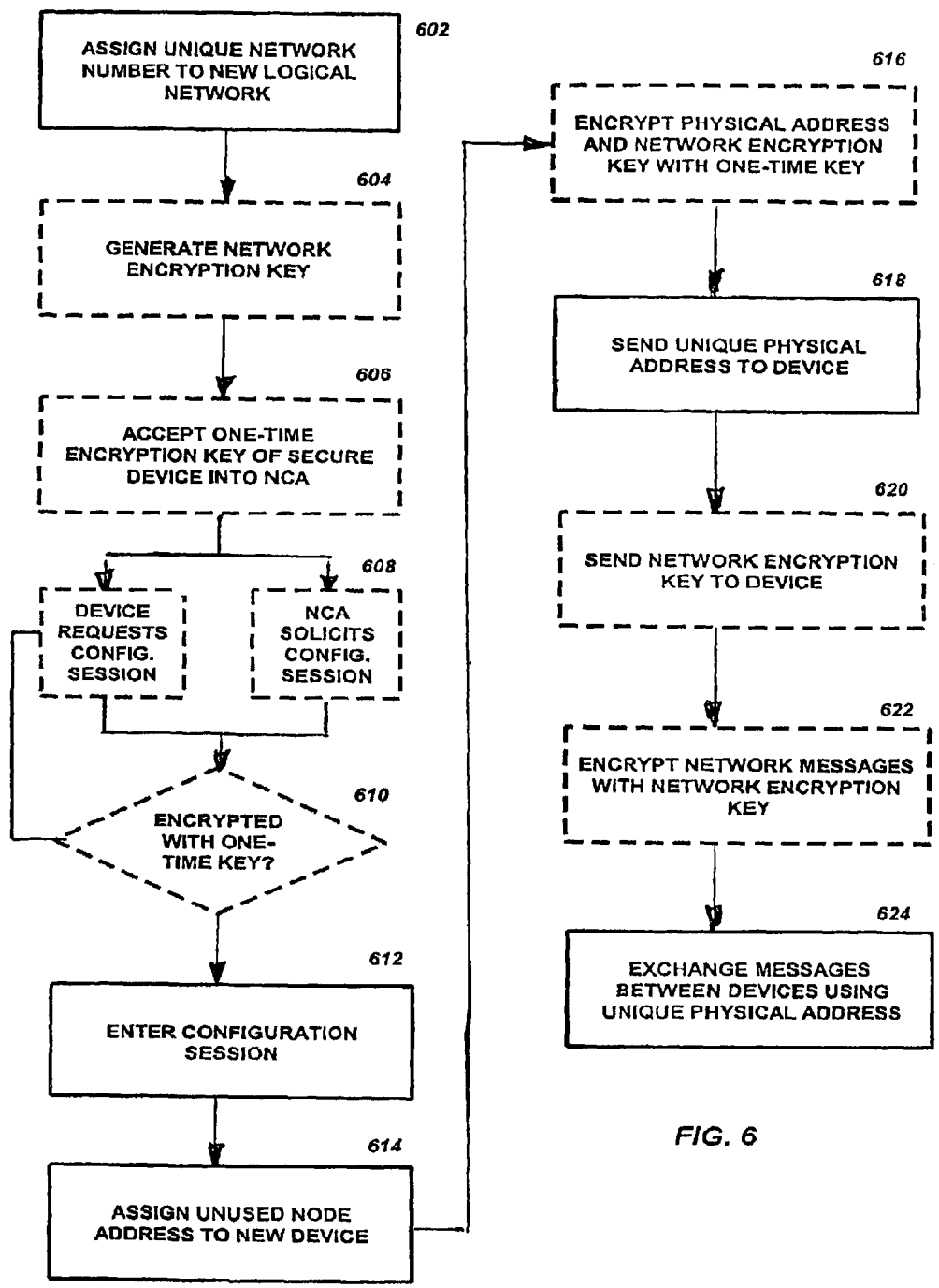
FIG. 6 is a flowchart depicting an exemplary method for configuring a logical network.

FIG. 6 is a flowchart describing an exemplary method for establishing a logical network of devices that share a common physical bus. For illustrative purposes, the method is described in conjunction with the arrangement depicted in FIGS. 1-5, but it will be understood that the method can be employed with other arrangements of networked devices. Steps of the method depicted in hashed shapes represent different exemplary embodiments.

The method begins at step 602 by assigning a unique network number to the new logical network that is to be established. As described above, an NCA scans for other logical networks operating in the shared bus network when the NCA is first connected to the bus. The NCA determines the network numbers of any logical networks operating on the shared bus, and chooses an unused network number to uniquely identify its new logical network.

The method continues at step 604, in which a network encryption key for the new logical network is generated. Recall, that the NCA may generate the unique key based on the network number used to identify the new logical network. Next, at step 606, a one-time encryption key may be accepted by the NCA. Recall that this one-time key is preferably associated with a single secure smart device, and may be accepted by a secure NCA that includes input circuitry for accepting the key.

At step 608, either the smart device may request a configuration session with an NCA or an NCA may solicit unconfigured devices to participate in a configuration session. If a one-time encryption key was accepted by the NCA at step 606, then a determination is made at step 610 as to whether the requests from the device and/or solicitations from the NCA are encrypted using a valid one-time key. If it is determined that a valid one-time key was not used, then the method returns to step 608 where device requests or NCA solicitations occur. If instead it is determined at step 610 that a valid one-time key was used, then the method proceeds to step 612 where the device and NCA enter a configuration session.

While in the configuration session, preferably an unused node address is assigned to the new device at step 614. Alternatively, the NCA could co-assign a node number already assigned within the NCA's logical network to be able to address multiple devices within the logical network using a single logical address. By assigning a unique node number to the new device, the assigned node number may be combined with the network number of the logical network to form a corresponding unique logical address for the new device on the shared bus. Recall that the logical address differs from the physical address of the device on the shared bus. This allows the device to intercommunicate with other devices belonging to its logical network, while essentially remaining isolated from the operation of other devices connected to the same shared bus.

If a one-time key for the new device was accepted at step 606, the logical address of the device and possibly the encryption key for the logical network are encrypted using the accepted one-time key at step 616. Next, the logical address, formed from the combination assigned node and network numbers, is sent to the device over the shared bus at step 618. If a network encryption key was generated at step 604, this encryption key is also sent to the device at step 620. At this point, the configuration session between the new device and the NCA ends, and the device now logically belongs to the NCA's logical network, while being physically connected to the shared bus. From this point, the newly configured device will only respond to messages addressed to its logical address until reconfigured into a different logical network space.

If a network encryption key was generated at step 604, any messages to be exchanged between the newly configured device and the NCA are encrypted with the network encryption key at step 622. Messages are then exchanged over the shared network, securely if one-time and network encryption keys are employed, between devices in the logical network using the devices' respective logical addresses.

As described above, the techniques for configuring multiple logical networks of devices on a single physical network may be applied to networks that use wired or wireless media. Applicant acknowledges that many of the hardware devices designed to operate over these media, especially those designed to operate over wireless media, have hardware identifiers (or addresses) pre-assigned to them by manufacturers. Unique hardware addresses are pre-assigned based on the various communication protocols used by the devices. In these cases where the devices already have pre-assigned hardware devices, the NCA need not necessarily assign a logical address using the techniques described above. Instead, the devices may be addressed within the logical network using their pre-assigned addresses. Still, it will be advantageous for the NCA to facilitate the transfer of network and one-time encryption keys between devices of a given logical network in order to support the secure exchange of messages over the shared bus.

It will be appreciated that the steps of the methods illustrated above may be readily implemented either by software that is executed by a suitable processor or by hardware, such as an application-specific integrated circuit (ASIC).

Various aspects have been described in connection with a number of exemplary embodiments. To facilitate an understanding of these embodiments, many aspects were described in terms of sequences of actions that may be performed by elements of a computer system. For example, it will be recognized that in each of the embodiments, the various actions could be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Thus, the various aspects may be embodied in many different forms, and all such forms are contemplated to be within the scope of what has been described. For each of the various aspects, any such form of embodiment may be referred to herein as "logic configured to" perform a described action, or alternatively as "logic that" performs a described action.

Although various exemplary embodiments have been described, it will be understood by those of ordinary skill in this art that these embodiments are merely illustrative and that many other embodiments are possible. The intended scope of the invention is defined by the following claims rather than the preceding description, and all variations that fall within the scope of the claims are intended to be embraced therein.

What is claimed is:

1. An apparatus for configuring a new logical network, the apparatus comprising:
   a circuit configured to query devices via a shared power line carrier (PLC) bus in order to detect configuration apparatuses, wherein each of the detected configuration apparatuses is associated with a respective logical network;
   logic configured to determine network numbers assigned to detected configuration apparatuses, respectively, and to select a network number for the apparatus, the selected network number being different from network numbers assigned to the detected configuration apparatuses, respectively, each of which is directly connected to the shared PLC bus;
   logic configured to assign a logical address to at least one device, the assigned logical address being different from all logical addresses associated with other devices directly connected to the shared PLC bus;
   wherein the at least one device responds only to information addressed to its assigned logical address within the new logical network;
   logic configured to generate a network encryption key associated with the new logical network for encrypting/ decrypting information exchanged among devices belonging to the new logical network;
   wherein the logic configured to assign the logical address comprises logic configured to assign a node address to the at least one device, and logic configured to calculate the logical address by combining the selected network number with the node address assigned to the at least one device to form the logical address.

2. The apparatus of claim 1, further comprising a switch, wherein the logic configured to assign the logical address assigns the logical address to the at least one device in response to activation of the switch.

3. The apparatus of claim 1, further comprising logic configured to accept a request from the at least one device, wherein the logic configured to assign the logical address assigns the logical address to the at least one device in response to the request.

4. The apparatus of claim 1, wherein the logic configured to generate a network encryption key comprises a random number generator that uses the selected network number as a seed for generating the network encryption key.

5. An arrangement of logical networks of devices operating on a single physical network, the arrangement comprising:
   a shared PLC bus;
   a number of devices connected to the shared PLC bus; and
   network configuration apparatuses (NCAs) associated with respective logical networks operating on the physical network;
   a first NCA associated with a first logical network comprising:
   a circuit configured to query devices via the shared PLC bus in order to detect the NCAs;
   logic configured to select a network number for the first NCA, the selected network number being different from network numbers assigned to the detected NCAs, respectively;
   logic configured to assign a logical address to at least one device, the assigned logical address being different from all logical addresses associated with other devices directly connected to the shared PLC bus;
   wherein the at least one device responds only to information addressed to its assigned logical address within the new logical network;
   wherein the logic configured to select the network number comprises logic configured to determine the network numbers assigned to the detected NCAs before the selection of the network number for the first NCA;
   logic configured to generate a network encryption key for the first logical network, the network encryption key is used for encrypting/decrypting information exchanged among the devices belonging to the first logical network;
   wherein the logic configured to assign the logical network number comprises logic configured to assign a node address to the at least one device, and logic configured to calculate the logical address by combining the selected network number with the node address to form the logical address of the at least one device.

6. The arrangement of claim 5, wherein the first NCA comprises a switch, wherein the logic configured to assign the logical address assigns the logical address to the at least one device in response to activation of the switch.

7. The arrangement of claim 5, wherein the at least one device comprises:
   logic configured to accept a solicitation to enter the session with the at least one first device only while the at least one device is operating in a configuration mode for a limited amount of time.

8. The arrangement of claim 5, wherein the logic configured to generate the network encryption key comprises a random number generator that uses the selected network number as a seed for generating the network encryption key.

9. A method of operating a configuration apparatus to configure a first logical network connected to a shared PLC bus, the method comprising:
    querying devices via the shared power line carrier (PLC) bus in order to detect configuration apparatuses and their respective network numbers, wherein each of the detected configuration apparatuses is associated with a respective logical network;
    after querying the devices, selecting a network number for the configuration apparatus, the selected network number being different from the network numbers assigned to the detected configuration apparatuses, respectively, each of which is directly connected to the shared PLC bus;
    assigning a node address to at least one device;
    combining the node address with the selected networks number to create a logical address;
    assigning the logical address to the at least one device, the assigned logical address being different from all logical addresses associated with other devices directly connected to the shared PLC bus;
    generating a network encryption key associated with the first logical network; and
    encrypting/decrypting information exchanged among other devices belonging to the first logical network using the generated network encryption key;
    wherein the at least one device responds only to information addressed to its assigned logical address within the new logical network.

10. The method of claim 9, further comprising activating a switch, wherein the logic configured to assign the logical address assigns the logical address in response to activation of the switch.

11. The method of claim 9, wherein generating the network encryption key comprises generating a random number using the selected network number.

* * * * *